United States Patent
Kanazawa (10) Patent No.: US 6,369,513 B1
(45) Date of Patent: Apr. 9, 2002

(54) VEHICLE LAMP LIGHTING-DRIVING APPARATUS

(75) Inventor: Akiyoshi Kanazawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/650,753

(22) Filed: Aug. 30, 2000

(30) Foreign Application Priority Data

Aug. 31, 1999 (JP) .......................................... 11-245211

(51) Int. Cl.$^7$ ................................................. B60Q 1/02
(52) U.S. Cl. .......................... 315/82; 315/224; 315/77; 307/10.8
(58) Field of Search .............................. 315/77, 82, 83, 315/291, 307, 224, 225, 209 R; 307/100, 10.8

(56) References Cited

U.S. PATENT DOCUMENTS

| | | | |
|---|---|---|---|
| 4,890,037 A | * 12/1989 | Izawa et al. ................... | 315/82 |
| 5,151,634 A | * 9/1992 | Nepote et al. ................. | 315/82 |
| 5,239,234 A | * 8/1993 | Pischke et al. ............... | 315/119 |
| 5,334,914 A | * 8/1994 | Sean et al. ................... | 315/291 |
| 5,821,700 A | * 10/1998 | Malvaso ....................... | 315/291 |

FOREIGN PATENT DOCUMENTS

JP        5-168164        7/1993

* cited by examiner

Primary Examiner—Don Wong
Assistant Examiner—Jimmy T. Vu
(74) Attorney, Agent, or Firm—Armstrong, Westerman & Hattori, LLP (57) ABSTRACT

A vehicle lamp lighting-driving apparatus is provided, which includes: a lighting driving means to lighting-drive a lamp; a driving signal generating means to generate a pulse driving signal having a pulse with a duty factor to make a power consumption of the lamp be a rated value of the lamp; and a driving controlling means to on/off-drive the lighting driving means according to the pulse driving signal, wherein the driving signal generating means generates an auxiliary driving signal which makes the driving controlling means control the lighting driving means so that a current to flow to the lamp through the lighting driving means is limited for a definite time, until a rush current at a time of on-driving of the lighting driving means gets equal to or smaller than an allowable value, prior to the pulse driving signal at a start of lighting the lamp.

6 Claims, 5 Drawing Sheets

VEHICLE LAMP LIGHTING-DRIVING APPARATUS

BACKGROUND OF THE INVENTION

1. Field of the Invention

The present invention relates generally to a vehicle lamp lighting-driving apparatus, and more particularly to a vehicle lamp lighting-driving apparatus wherein a lamp is lighted by the use of a battery power source having a voltage higher than a required voltage of the lamp.

2. Description of the Related Art

A battery having a voltage of 12 volts (hereinafter "V") is generally used as a vehicle carried battery power source. However, because there are a lot of vehicle applied devices which require a voltage higher than 12V for effective operation, and also the higher voltage enables a power feeder to be thinner, a high-voltagization of a power source has begun to be studied recently.

There exist, however, loads which are difficult to be operated with a higher voltage. As one of the above loads, there exists a lamp. In case of a lamp, when a battery power source of a higher voltage is used, a power consumption thereof increases due to its current increase. Besides, deterioration or a melt-breaking of a filament of the lamp, caused by generation of heat, would arise.

For example, in case that the voltage of a battery power source for a lamp is raised to 3times and the resistance value of the lamp is below 9 times, the power consumption increases. A filament shall be lengthened in order to make the resistance value 9 times, which requires a shape of the filament and therefore a shape of a reflector to be changed. Like this, it would not be easy to obtain a lamp suitable to a higher voltage.

Therefore, carrying a plurality of battery power sources including a generally used 12V battery power source has also begun to be studied so as to apply a generally used 12V lamp. In such a case, however, a voltage raising means or a voltage lowering means for an alternate voltage generated by an alternator is also required. Therefore, to lighting-drive a generally used 12V lamp by the use of the battery power source having the higher voltage is being studied.

Japanese Patent Application Laid-open No.5-168164 discloses a lamp lighting-driving apparatus (FIG. 5), wherein a battery power source of an effective voltage of 42V is applied to a lamp having a required voltage of 12V.

Figure 5:
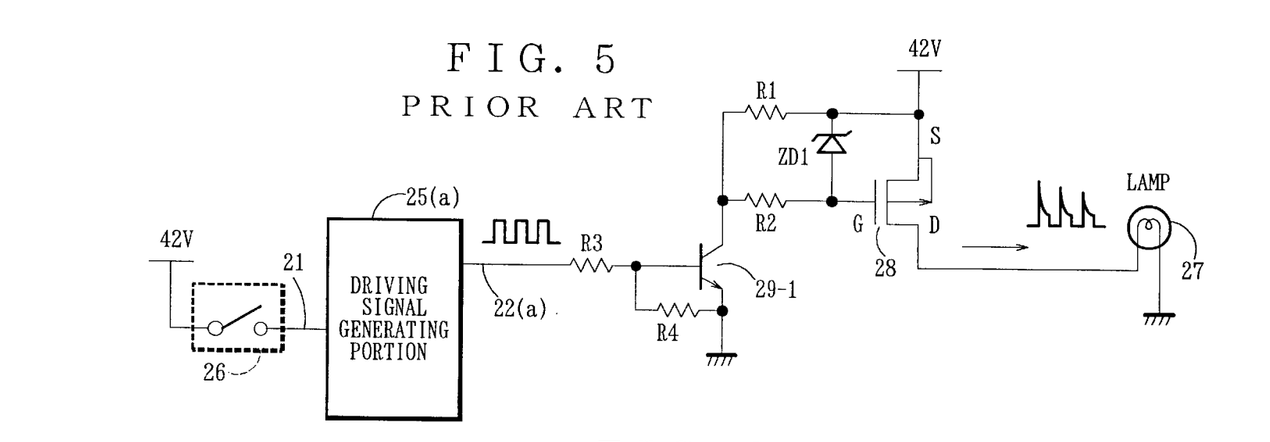
FIG. 5 is a circuit diagram showing the details of a prior art vehicle lamp lighting-driving apparatus.

As shown in FIG. 5, a battery power source (not illustrated) of the effective voltage 42V is applied to the lamp 27 through a FET (i.e. field-effect transistor) 28. On/off-driving of the FET 28 is carry out through a resistance R2, a transistor 29-1, and a resistance R3, based on a pulse driving signal generated by a driving signal generation portion 25(a). The period of the pulse forming the pulse driving signal is set to a time period not allowing recognition of on-and-off of the lamp 27.

The driving signal generating portion 25(a) watches a state of a switch 26 connected to an input terminal 21 for lighting the lamp installed on a vehicle operating panel, and generates and outputs the pulse driving signal from an output terminal 22(a) while the switch 26 is closed.

The above pulse driving signal is outputted so that a duty factor thereof is the same as that of the case wherein the lamp 27 is lighted with the usual 12V. Because the battery power source of the effective voltage of 42V applies a voltage of 36V to the lamp 27. That is, a voltage of 3 times the usual 12V is applied to the lamp.

Figure 6:
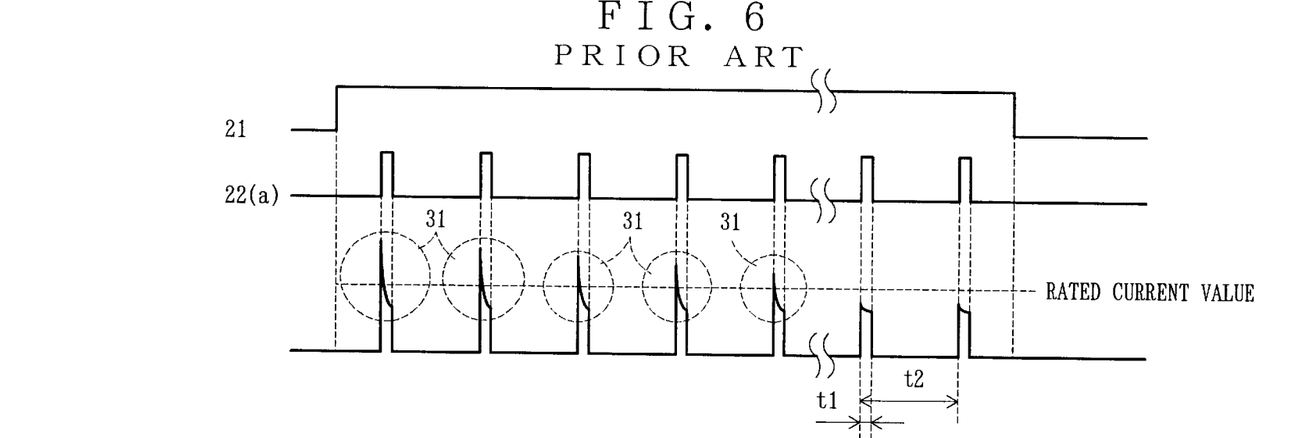
FIG. 6 is a timing chart showing the details of operation of the prior art vehicle lamp lighting-driving apparatus.

In such a case, the power consumption of the lamp 27 becomes 9 times. Then, as shown in FIG. 6, a duty factor t1/t2 is set to 1/9 to shorten duration of a current to the lamp 27 and to equalize a power consumption to the case of driving the lamp 27 with 12V.

At a timing of the output from the output terminal 22(a) being High, a current flows to the resistance R4 and a voltage is generated between base-collector of the transistor 29-1. Accordingly, the transistor 29-1 becomes an ON state because a resistance value between base-emitter of the transistor 29-1 becomes smaller in comparison with a resistance value at a timing of the output from the output terminal 22(a) being Low. At this time, the FET 28 is on-driven because a voltage is generated between source-gate of the FET 28 by means of a voltage drop due to a current flowing through the resistance R1. And, a current flows to the lamp 27 connected to the drain of the FET 28.

At a timing of the output from the output terminal 22(a) being Low, the transistor 29-1 becomes an OFF state because a resistance value between base-emitter of the transistor 29-1 becomes large in a degree capable of ignoring the resistance R1. At this time, because a current does not flow to the resistance R1, a voltage drop is not generated. Accordingly, the FET 28 becomes an OFF state because the voltage is not generated between source-gate of the FET 28, and a current does not flow through the lamp 27.

With the above apparatus, because the lamp 27 consumes electric power while the FET 28 is on-driven, the power consumption of the lamp 27 is the same as that of the case of the 12V battery power source. And, an effective value of the current flowing through the cable for applying the voltage to the FET 28 can be decreased.

With respect to the structure shown in FIG. 5, however, a current exceeding the rated current of the lamp 27 suddenly flows thereto just after the voltage is applied to the lamp 27, which causes to shorten lifetime of the lamp 27. The current exceeding the rated current is called a rush current.

A resistance value of the lamp 27 is extremely small while the temperature is low, and therefore the rush current flows just after the voltage has been applied to the lamp 27. Upon generation of heat by the lamp 27, the resistance value of the lamp 27 increases, which lowers a current flowing to the lamp 27.

Upon cutting the current to the lamp 27, the lamp 27 stops generating heat, and the temperature goes down, which lowers the resistance value of the lamp 27. When the voltage is applied again to the lamp 27 subsequently the above, the rush current also flows to the lamp 27. However, because the temperature of the lamp 27 itself rises, the level of the rush current is lowered.

FIG. 6 is a timing chart showing the details of operation of the prior art vehicle lamp lighting-driving apparatus. On closing the switch 26, the driving signal generating portion 25(a) detects voltage at the input terminal 21 and outputs the pulse driving signal from the output terminal 22(a). The pulse driving signal continues to be outputted until the voltage at the input terminal 21 is not detected.

When a current begins to flow to the lamp 27, the rush current 31 flows as shown in FIG. 6. The rush current 31 repeatedly flows into the lamp 27 at a timing of High-level of the pulse driving signal outputted from the driving signal generating portion 25(a) until the temperature of the filament of the lamp 27 rises enough.

Because the rush current 31 is in proportion to the voltage applied to the lamp 27, the higher the voltage of the battery power source is, the larger the rush current is. The lifetime of the lamp 27 is shortened by the repeated large rush current 31.

SUMMARY OF THE INVENTION

In view of the foregoing, an object of the present invention is to provide a vehicle lamp lighting-driving apparatus, wherein a lamp, which is lighted by the use of a battery power source having a voltage higher than a rated voltage of the lamp, is driven with a pulse having a duty factor to make a power consumption of the lamp be a rated value and deterioration of the lamp is prevented by controlling an occurrence of a rush current to the lamp.

Figure 1:
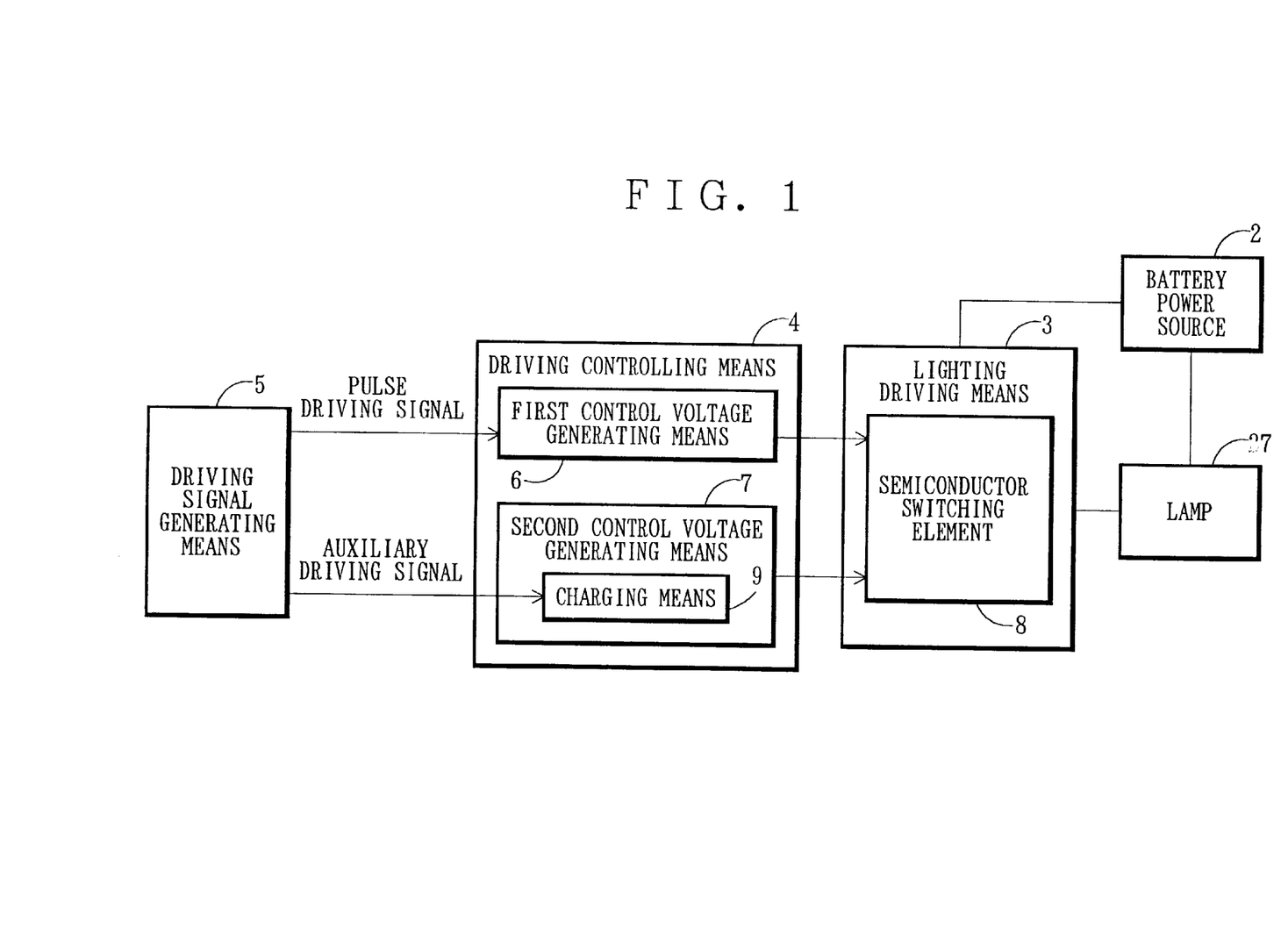
FIG. 1 is a block diagram showing a basic structure of a vehicle lamp lighting-driving apparatus in the present invention.

In order to achieve the above-described object, as a first aspect of the present invention, a vehicle lamp lighting-driving apparatus as shown in FIG. 1 comprises: a lighting driving means 3 to lighting-drive a lamp 27; a driving signal generating means 5 to generate a pulse driving signal having a pulse with a duty factor to make a power consumption of the lamp 27 be a rated value of the lamp; and a driving controlling means 4 to on/off-drive the lighting driving means 3 according to the pulse driving signal, wherein the driving signal generating means 5 generates an auxiliary driving signal which makes the driving controlling means 4 control the lighting driving means 3 so that a current to flow to the lamp 27 through the lighting driving means 3 is limited for a definite time, until a rush current at a time of on-driving of the lighting driving means 3 gets equal to or smaller than an allowable value, prior to the pulse driving signal at a start of lighting the lamp 27.

According to the above vehicle lamp lighting-driving apparatus, the lamp 27 can be lighted with use of the battery power source 2 having a voltage higher than a required voltage of the lamp, without deteriorating the lamp. Because a current to flow to the lamp 27 through the driving means 3 is limited for the definite time by means of the auxiliary driving signal generated by the driving signal generating means 5, prior to the pulse driving signal at the start of lighting the lamp 27, a rush current to flow to the lamp at the start of lighting it can be limited, thereby preventing deterioration of the lamp.

As a second aspect of the present invention, in the structure with the above first aspect, the auxiliary driving signal is of a pulse to be generated at the start of lighting the lamp 27 prior to the generation of the pulse driving signal, the pulse making the driving controlling means 4 control the lighting driving means 3, and a current to flow to the lamp 27 through the lighting driving means 3 is continuously limited for a duration of the pulse.

According to the above vehicle lamp lighting-driving apparatus, because a current to flow to the lamp 27 through the lighting driving means 3 is continuously limited for the definite time by means of the auxiliary driving signal, which is generated prior to an occurrence of the pulse driving signal at the start of lighting the lamp 27 and lasts for the definite time, a rush current to flow at the start of lighting-driving can be limited by means of the simple auxiliary driving signal, thereby preventing deterioration of the lamp without causing a large cost increase.

As a third aspect of the present invention, in the structure with the above second aspect, the driving controlling means has a first control voltage generating means to generate a first control voltage which on/off-controls the lighting driving means by the pulse driving signal and a second control voltage generating means to generate a second control voltage which limits a current, according to the auxiliary driving signal, to flow to the lamp through the lighting driving means.

According to the above vehicle lamp lighting-driving apparatus, because on/off-driving of the lighting driving means 3 and the lighting-controlling to control a current value of the lamp 27 through the lighting driving means 3 are carried out by means of the first and second control voltages generated by the pulse driving signal and the auxiliary driving signal, the lighting driving means capable of controlling voltage is provided, thereby preventing deterioration of the lamp without causing a large cost increase.

As a fourth aspect of the present invention, in the structure with the above third aspect, the lighting driving means has a single semiconductor switching element, which is on/off-driven by the first control voltage and whose conductivity can be controlled by the second control voltage.

According to the above vehicle lamp lighting-driving apparatus, because one semiconductor switching element 8 of the lighting driving means 3 is on/off-driven by the first control voltage and a conductivity is controlled by the second control voltage, it is not necessary to specially modify a structure of the lighting driving means, thereby preventing deterioration of the lamp without causing a large cost increase.

As a fifth aspect of the present invention, in the structure with either one of the above third and fourth aspects, the second control voltage generating means has a charging means to flow a charging current, according to the auxiliary driving signal, for the duration of the auxiliary driving signal and generates the second control voltage, based on the charging current.

According to the above vehicle lamp lighting-driving apparatus, because the second control voltage is generated on the basis of a charging current to be flown to the charging means 9 of the second control voltage generating means 7 for a time period corresponding to the duration of the auxiliary driving signal, the charging current does not flow over the duration of the auxiliary driving signal and also the second control voltage is not generated over the duration of the auxiliary driving signal.

The above and other objects and features of the present invention will become more apparent from the following description taken in conjunction with the accompanying drawings.

DESCRIPTION OF THE PREFERRED EMBODIMENT(S)

An embodiment of the present invention will now be described in further detail with reference to the accompanying drawings.

Figure 2:
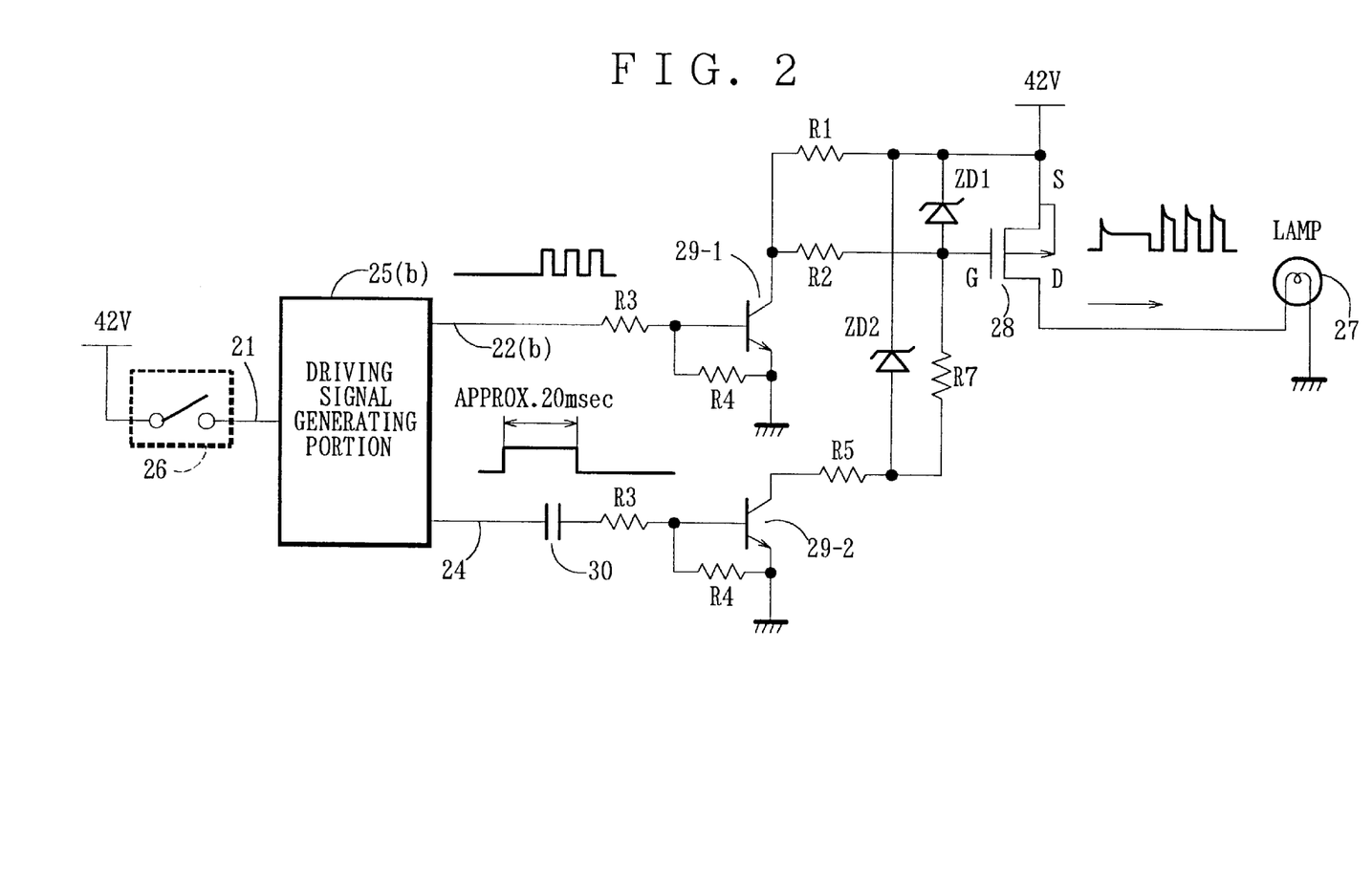
FIG. 2 is a circuit diagram showing the details of the vehicle lamp lighting-driving apparatus in the present invention.

FIG. 2 is a circuit diagram of the embodiment of the present invention.

The vehicle lamp lighting-driving apparatus in the present invention increases the resistance value of a lamp 27 in advance by raising the temperature of the lamp 27. And, by on/off-driving a FET 28 after the temperature of the lamp 27 has sufficiently risen, a rush current to flow into the lamp 27 is prevented.

A battery power source having an effective voltage of 42V (i.e. 42 volts) is connected to the indication of 42V in FIG. 2. The battery power source is connected to the source of the FET 28, the cathode of each of Zener diodes ZD1,ZD2, and the collector of a transistor 29-1 through a resistance R1.

The collector of the transistor 29-1 is connected to the gate of the FET 28 and to the anode of the Zener diode ZD1, through the resistance R2. The gate of the FET 28 is connected to the anode of the Zener diode ZD2 through a resistance R7.

And, the anode of the Zener diode ZD2 is connected to the collector of a transistor 29-2 through a resistance R5.

The drain of the FET 28 is connected to a ground through the lamp 27. And, the base of the transistor 29-1 is connected to an output terminal 22(b) of a driving signal generating portion 25(b) through the resistance R3, and, the base of the transistor 29-2 is connected to an output terminal 24 of the driving signal generating portion through the resistance R3 and a condenser 30.

And, a resistance R4 is connected between base-emitter of each of the transistors 29-1,29-2, whereby a base voltage which puts the transistor in an ON state arises by means of a voltage drop due to a current which flows when the output terminal 22(b) or the output terminal 24 outputs a High-level.

Similarly to the prior art one, the battery power source of effective voltage 42V is supplied to the lamp 27 through the FET 28. On/off-driving of the FET 28 is carried out by the driving signal generating portion 25(b) having a function of outputting a pulse driving signal made of successive pulses, through the resistance R3 and the transistor 29-1. And, the driving signal generating portion 25(b) continuously watches a state of a switch 26 for lighting a lamp, which switch is provided on an operating panel of a vehicle.

In addition, the driving signal generating portion 25(b) controls the FET 28 through the resistance R3, the transistor 29-2, and the resistance R5. And, the driving signal generating portion 25(b) has the output terminal 24 which is connected to the transistor 29-2 through a condenser 30 and the resistance R3.

Figure 3:
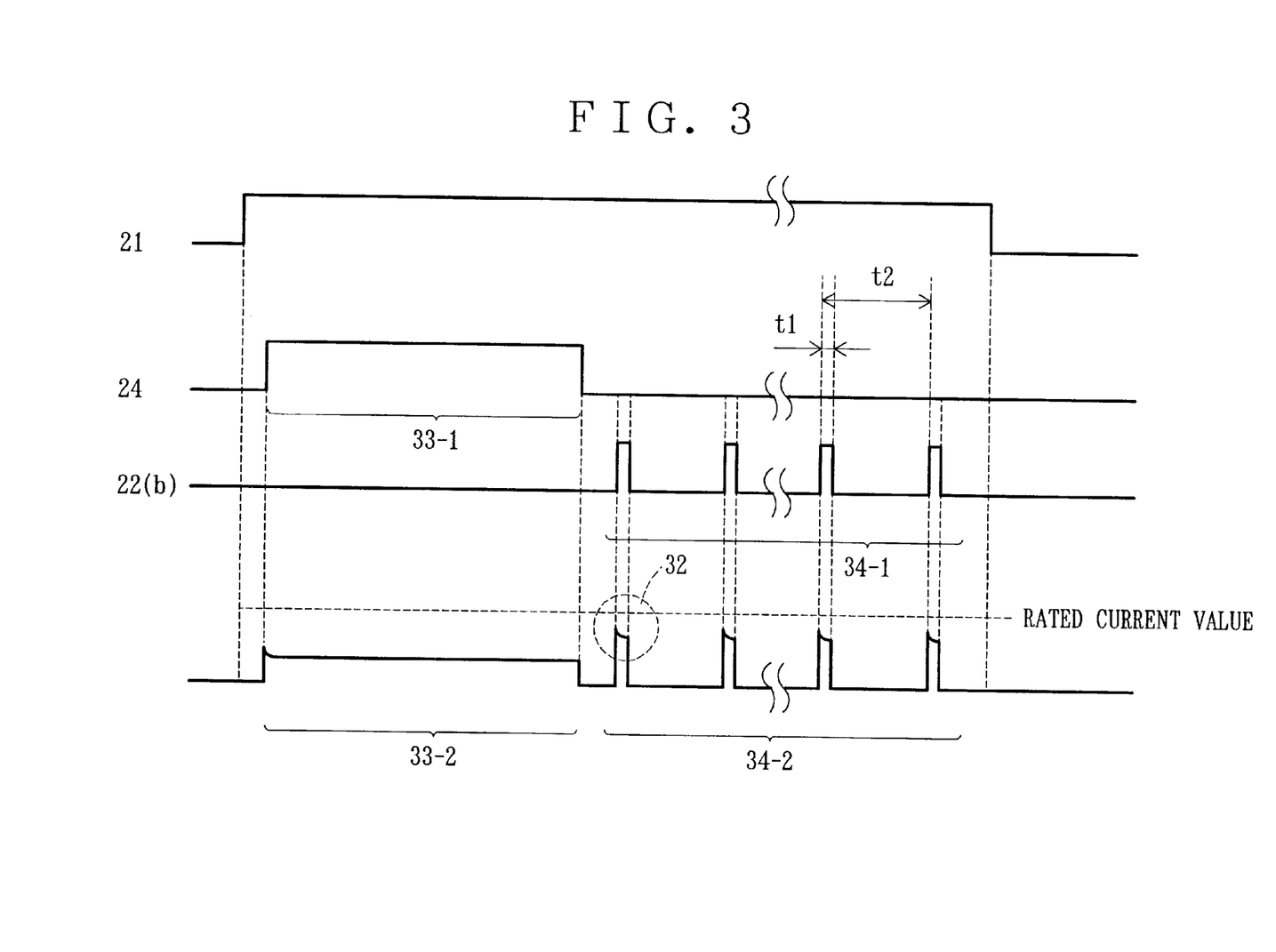
FIG. 3 is a timing chart showing the details of operation of the vehicle lamp lighting-driving apparatus in the present invention.

As shown in FIG. 3, the driving signal generating portion 25(b) of the present invention outputs an auxiliary driving signal 33-1, which is a lasting High-level pulse, from the output terminal 24 just after the switch 26 has been closed and a voltage has been applied to the input terminal 21. And, while the output terminal 24 outputs the auxiliary driving signal 33-1, the output terminal 22(b) is fixed to a Low-level.

As shown in FIG. 2, the signal outputted from the output terminal 24 is inputted into the transistor 29-2, for which the resistances R3,R4 are provided, through the condenser 30. The resistances R3,R4 are also provided for the transistor 29-1 connected to in the output terminal 22(b) in the same way, wherein a current flows through the resistance R4 when the output terminal 24 outputs the High-level, a voltage between collector-emitter of the transistor 29-1 is brought about, and the transistor 29-1 becomes an ON state.

And, when the voltage between gate-source of the FET 28 has exceeded a ceiling voltage of secure operation of the FET 28, deterioration or breakage of the FET 28 is brought about. Therefore, a Zener voltage of the Zener diode ZD1 is lower than the ceiling voltage and is sufficiently high for making the FET 28 in the ON state.

And, a Zener voltage of the Zener diode ZD2 is lower than the Zener voltage of the Zener diode ZD1. An ON resistance, to be generated between source-drains when the voltage between source-gate of the FET 28 has become a voltage to be decided from the Zener voltage of the Zener diode ZD2 on the basis of the resistances R1,R2 and the resistance R7, is controlled in a degree that a rush current flowing to the lamp 27 does not deteriorate the lamp.

When the output terminal 24 begins to output the auxiliary driving signal 33-1 shown in FIG. 3, the voltage between base-emitter of the transistor 29-2 goes up and the transistor 29-2 becomes ON state. Consequently, a current flows from the battery power source to the ground through the resistances R1,R2,R7,R5 and the transistor 29-2.

When voltage drop due to the resistances R1,R2,R7 has become equal to the Zener voltage of the Zener diode ZD2, the Zener diode ZD2 becomes ON state, a Zener breakdown effect is brought about on the Zener diode ZD2, and the voltage between source-gate of the FET 28 becomes a voltage to be decided from the above Zener voltage on the basis of the resistances R1,R2 and the resistance R7, whereby a rush current in a degree of not deteriorating the lamp 27 flows therein.

And, when the Zener breakdown effect has been brought about on the Zener diode ZD2, a Zener breakdown effect is not brought about on the Zener diode ZD1 because the voltage between anode-cathode of the Zener diode ZD1 is lower than a Zener voltage of the Zener diode ZD1.

If the Zener diode ZD2 is not provide, the voltage between base-emitter of the transistor 29-2 lowers and a resistance value between collector-emitter of the transistor 29-2 rises with the charge to the condenser 30, whereby the voltage between gate-source of the FET 28 becomes unstable. The Zener diode ZD2 shown in FIG. 2 stabilizes the voltage between source-gate of the FET 28.

And, in case that fluctuation of voltage of the battery power source or electromagnetic wave occurs, the voltage between source-gate of the FET 28 stays unchanged by providing the Zener diode ZD2 at the position shown in FIG. 2.

While the output terminal 24 outputs the auxiliary driving signal 33-1, a current in a degree of not deteriorating the lamp continue s to flow to the lamp 27 and the temperature of the lamp 27 continues to rise.

And, because the output terminal 24 outputs the Low-level after having outputted the auxiliary driving signal 33-1 for a defined time, the transistor 29-1 gets an OFF state. Accordingly, the FET 28 becomes an OFF state, and therefore a current does not flow to the lamp 27.

Even if the output terminal 24 continues to output the auxiliary driving signal 33-1 over the determined time, because the voltage between base-emitter of the transistor 29-2 lowers with the charge to the condenser 30 and a resistance value between collector-emitter rises, the transistor 29-1 gets an OFF state after the definite time, which makes the FET 28 put in an OFF state, whereby a current does not flow to the lamp 27.

A voltage to be generated between gate-source of the FET 28 when the transistor 29-2 becomes an ON state is smaller than a voltage to be generated between gate-source of the FET 28 when the transistor 29-1 becomes an ON state.

In a power MOSFET, when the voltage between gate-source rise, an ON resistance value to be generated between source-drain decreases, and when the voltage between gate-source drops, an ON resistance value to be generated between source-drain increases.

Accordingly, an ON resistance value to be generated between source-drain of the FET 28 when the transistor 29-2 becomes an ON state is larger than a resistance value between collector-emitter in a state of the transistor 29-1 being in an ON state.

Therefore, as shown in FIG. 3, when the output terminal 24 outputs the auxiliary driving signal 33-1 and the transistor 29-2 is in an ON state, a current 33-2 below a rated current value flows through the FET 28 to the lamp 27 connected to the drain of the FET 28 as shown with an arrow in FIG. 2.

The driving signal generating portion 25(b) outputs the auxiliary driving signal 33-1, which keeps the High-level for the definite time as shown in FIG. 3, from the output terminal 24. While the output terminal 24 outputs the auxiliary driving signal, the FET 28 develops heat due to an ON resistance. However, the FET 28 is not broken because the definite time is about 20ms, that is, very short.

Because the output terminal 24 outputs the auxiliary driving signal, which keeps the High-level for the definite time, the auxiliary driving signal can be formed even if the driving signal generating portion 25(b) is not specially structured.

After having continuously outputted the High-level from the output terminal 24 for the definite time, the driving signal generating portion 25(b) changes the output from the output terminal 24 to the Low-level and simultaneously begins to output a pulse driving signal 34-1 from an output terminal 22(b).

In a timing of the output of the output terminal 22(b) is of High, the transistor 29-1 is in an ON state. And, when a voltage drop due to a current flowing through the resistance R1 has become equal to the Zener voltage of the Zener diode ZD1, the Zener diode ZD1 becomes an ON state and the Zener breakdown effect is brought about on the Zener diode ZD1. In this state, the voltage between source-gate of the FET 28 becomes equal to the above Zener voltage, the FET 28 becomes an ON state, and a current flows through the lamp 27. And, the voltage between source-gate of the FET 28 becomes stable by the Zener breakdown effect of the Zener diode ZD1.

Though the Zener breakdown effect is brought about on the Zener diode ZD2 when the Zener breakdown effect is brought about on the Zener diode ZD1, a voltage between source-gate of the FET 28 becomes also equal to the Zener voltage of the Zener diode ZD1 due to the voltage drop of the resistance R7.

On the contrary, in a timing of the output of the output terminal 22(b) is of Low, the transistor 29-1 is in an OFF state. At this time, because a voltage drop does not occur at the resistance R1 because of no current flow through the resistance R1, voltage is not generated between source-gate of the FET 28. Accordingly, a current does not flow to the lamp 27 because the FET 28 becomes an OFF state.

When the transistor 29-1 is in an ON state, an ON resistance value to be generated between source-drain of the FET 28 is smaller than an ON resistance value to be generated between source-drain of the FET 28 when the transistor 29-2 is in an ON state.

Therefore, a current to flow into the lamp 27 in an ON state of the transistor 29-1 is larger than that in an ON state of the transistor 29-2. However, the temperature of the lamp 27 has been raised while the output of the output terminal 24 is in a High state, a current 34-2 flows to the lamp 27, and a rush current 32 contained in the current 34-2 does not exceed the rated current value.

Upon opening the switch 26, the driving signal generating portion 25(b) makes both of the outputs from the respective output terminals 22(b),24 Low, which puts the transistors 29-1,29-2 in an OFF state. Because voltage is not generated between source-gate of the FET 28 and the FET 28 becomes an OFF state, a current does not flow to the lamp 27, whereby the lamp 27 goes out.

In the present vehicle lamp lighting-driving apparatus, because the common FET 28 is controlled by the transistors 29-1,29-2, both of the control of warming the lamp 27 and the control of flashing on and off can be performed with a single semiconductor switching element 8.

Figure 4:
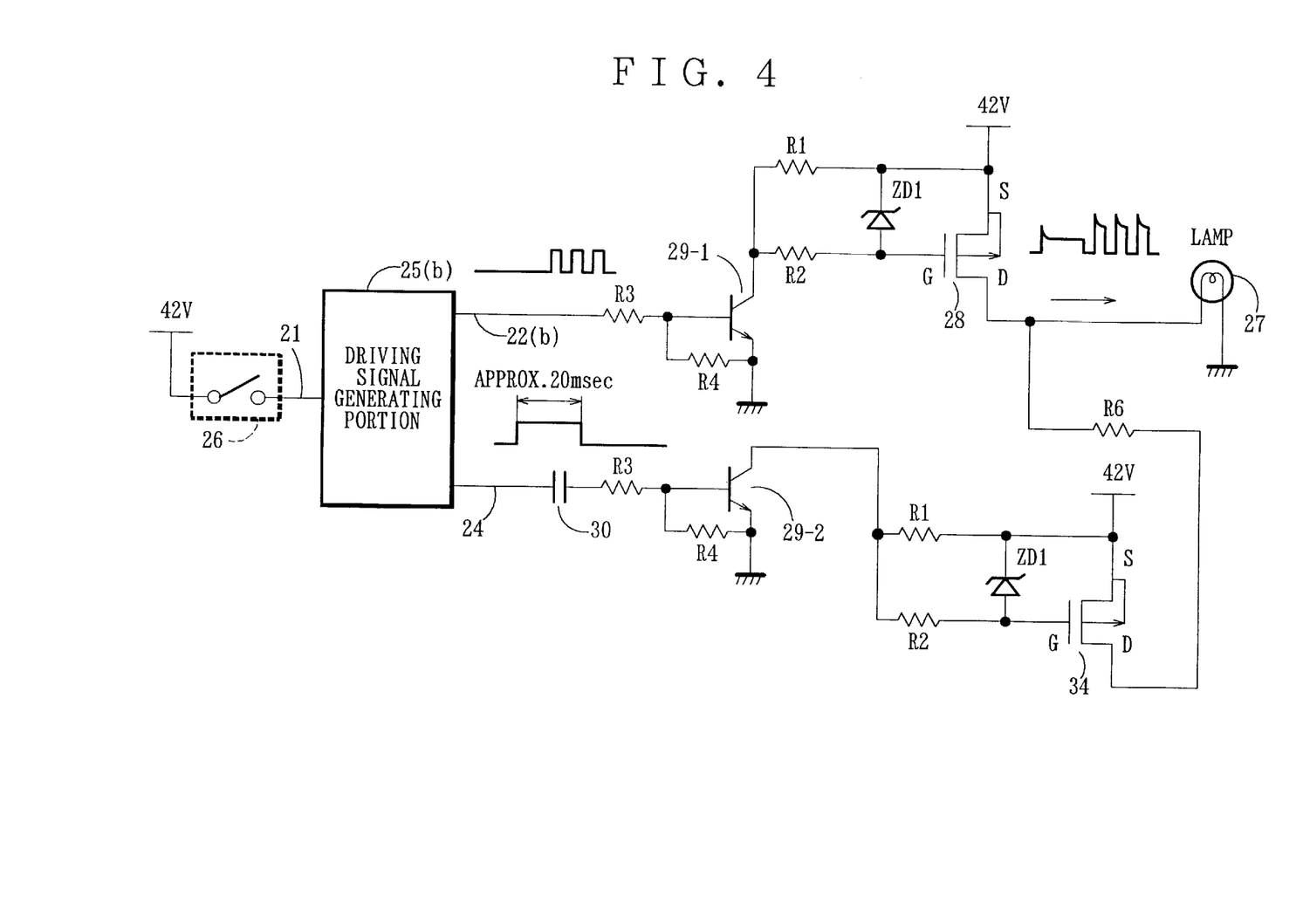
FIG. 4 is a circuit diagram showing the details of the vehicle lamp lighting-driving apparatus having a plurality of semiconductor switching elements.

Meanwhile, a modified embodiment is shown in FIG. 4, wherein a FET 34 is on-driven by the transistor 29-2 thereby to worm the lamp and a current to flow to the lamp is limited by a resistance R6 and a FET 28 is on/off-driven by the transistor 29-1 thereby to flash the lamp on and off.

Also, in the previous embodiment, because the condenser 30 and the resistances R3,R4 are connected in series, if the output terminal 24 outputs the High-level fixedly, caused by the misoperation of the driving signal generating portion 25(b), a current flowing the resistances R3,R4 decreases, whereby the voltage between base-emitter of the transistor 29-2 drops finally to 0V. During the above, the transistor 29-2 becomes an OFF state, and therefore the FET 28 becomes an OFF state, whereby a current does not flow through the lamp 27 finally.

That is, if the output terminal 24 outputs the High-level fixedly, caused by the misoperation of the driving signal generating portion 25(b), a current to flow through the lamp 27 returns normal after a certain time.

And, in the present invention, in case that a voltage of 3 times is applied to the lamp, the power consumption becomes 9 times. Therefore, the duty factor of t1/t2 shown in FIG. 3 is set to 1/9 in order to shorten a time to flow a current to the lamp 27 so that the power consumption can be equal to that of the case of 12V.

Here, PWM (i.e. Pulse Width Modulation) may be carried out to the pulse driving signal 34-1 continuously outputted from the output terminal 22(b) on the basis of the voltage of the battery power source. That is, when the voltage of the battery power source dropped, a duty factor of a pulse forming the pulse driving signal 34-1 is increased, and when the voltage of the battery power source rose, a duty factor of a pulse forming the pulse driving signal 34-1 is decreased, whereby even if the voltage of the battery power source fluctuates, the fluctuation of the power consumption of the lamp 27 may be prevented or the brightness of the lamp 27 may be controlled.

Following the above, relation among the elements shown in FIG. 1, the elements recited in the claims, and the constituents in the above embodiment is described.

The battery power source 2 corresponds to the battery power source of an effective voltage 42V.

The FET 28 corresponds to the semiconductor switching element 8 and forms the lighting driving means 3.

The driving signal generating means 5 corresponds to the driving signal generating portion 25(b), outputs the pulse driving signal 34-1 on the output terminal 22(b), and outputs the auxiliary driving signal 33-1 on the output terminal 24.

The transistor 29-1, the resistances R1,R2,R3,R4 all connected to the transistor 29-1, and the Zener diode ZD1 constitute the first control voltage generating means 6, which first control voltage generating means 6 is connected to the lighting driving means 3 in order to generate the first control voltage.

And, the condenser 30 and the resistances R3,R4 connected to the transistor 29-2 correspond to the charging means 9. The transistor 29-2, the resistances R3,R4,R5,R7, and the Zener diode ZD2 constitute the second control voltage generating means 7, which second control voltage generating means 7 is connected to the lighting driving means 3 in order to generate the second control voltage.

The driving controlling means 4 is made up of the first control voltage generating means 6 and the second control voltage generating means 7.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A vehicle lamp lighting-driving apparatus, comprising:

a lighting driving means to lighting-drive a lamp;

a driving signal generating means to generate a pulse driving signal having a pulse with a duty factor to make a power consumption of the lamp be a rated value of the lamp; and a driving controlling means to on/off-drive the lighting driving means according to the pulse driving signal, wherein the driving signal generating means generates an auxiliary driving signal which makes the driving controlling means control the lighting driving means so that a current to flow to the lamp through the lighting driving means is limited for a definite time, until a rush current at a time of on-driving of the lighting driving means gets equal to or smaller than an allowable value, prior to the pulse driving signal at a start of lighting the lamp.

2. The vehicle lamp lighting-driving apparatus as set forth in claim 1, wherein the auxiliary driving signal is of a pulse to be generated at the start of lighting the lamp prior to the generation of the pulse driving signal, the pulse making the driving controlling means control the lighting driving means, and a current to flow to the lamp through the lighting driving means is continuously limited for a duration of the pulse.

3. The vehicle lamp lighting-driving apparatus as set forth in claim 2, wherein the driving controlling means has a first control voltage generating means to generate a first control voltage which on/off-controls the lighting driving means by the pulse driving signal and a second control voltage generating means to generate a second control voltage which limits a current, according to the auxiliary driving signal, to flow to the lamp through the lighting driving means.

4. The vehicle lamp lighting-driving apparatus as set forth in claim 3, wherein the lighting driving means has a single semiconductor switching element, which is on/off-driven by the first control voltage and whose conductivity can be controlled by the second control voltage.

5. The vehicle lamp lighting-driving apparatus as set forth in claim 3, wherein the second control voltage generating means has a charging means to flow a charging current, according to the auxiliary driving signal, for the duration of the auxiliary driving signal and generates the second control voltage, based on the charging current.

6. The vehicle lamp lighting-driving apparatus as set forth in claim 4, wherein the second control voltage generating means has a charging means to flow a charging current, according to the auxiliary driving signal, for the duration of the auxiliary driving signal and generates the second control voltage, based on the charging current.

* * * * *